United States Patent
Chen et al.

(10) Patent No.: US 11,230,916 B2
(45) Date of Patent: Jan. 25, 2022

(54) TOOL POSITION DETECTION SYSTEM

(71) Applicant: Cameron International Corporation, Houston, TX (US)

(72) Inventors: Yang Chen, Houston, TX (US); Charles Deible, Katy, TX (US); Corey Ray, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 16/503,695

(22) Filed: Jul. 5, 2019

(65) Prior Publication Data
US 2020/0011168 A1   Jan. 9, 2020

Related U.S. Application Data

(60) Provisional application No. 62/694,887, filed on Jul. 6, 2018.

(51) Int. Cl.
| | |
|---|---|
| *E21B 47/09* | (2012.01) |
| *E21B 33/072* | (2006.01) |
| *G01V 1/40* | (2006.01) |
| *E21B 43/26* | (2006.01) |
| *G01V 11/00* | (2006.01) |
| *E21B 47/12* | (2012.01) |
| *E21B 47/107* | (2012.01) |
| *E21B 33/068* | (2006.01) |

(52) U.S. Cl.
CPC .............. *E21B 47/09* (2013.01); *E21B 43/26* (2013.01); *E21B 47/107* (2020.05); *E21B 47/12* (2013.01); *G01V 1/40* (2013.01); *G01V 11/002* (2013.01); *E21B 33/068* (2013.01); *E21B 33/072* (2013.01)

(58) Field of Classification Search
CPC ........ E21B 34/02; E21B 34/025; E21B 47/09; E21B 47/092; E21B 47/095
See application file for complete search history.

(56) References Cited

U.S. PATENT DOCUMENTS

| | | | | |
|---|---|---|---|---|
| 3,435,895 | A | 4/1969 | Lee | |
| 4,681,168 | A * | 7/1987 | Kisling, III | E21B 33/072 166/381 |
| 2004/0129424 | A1* | 7/2004 | Hosie | E21B 47/10 166/332.8 |
| 2012/0138312 | A1* | 6/2012 | Strong | E21B 43/16 166/377 |
| 2013/0249705 | A1* | 9/2013 | Sharp | E21B 47/092 340/854.7 |
| 2017/0362910 | A1* | 12/2017 | Stephens | E21B 47/13 |
| 2019/0186226 | A1* | 6/2019 | Beason | E21B 34/02 |

* cited by examiner

Primary Examiner — Robert E Fuller
Assistant Examiner — Lamia Quaim
(74) Attorney, Agent, or Firm — Helene Raybaud

(57) ABSTRACT

A technique facilitates use of tools downhole during well operations. According to an embodiment, the technique employs a frac stack which may be coupled to a wellhead. The frac stack may include a flow control device which opens and closes a bore extending through the wellhead. A lubricator may be coupled to the frac stack. The lubricator includes a tool trap which opens and closes to facilitate controlled movement of a tool along the bore. A tool position detection system is used to detect a position of the tool in the tool trap to ensure, for example, removal of the tool from the frac stack before closure of the flow control device.

20 Claims, 8 Drawing Sheets

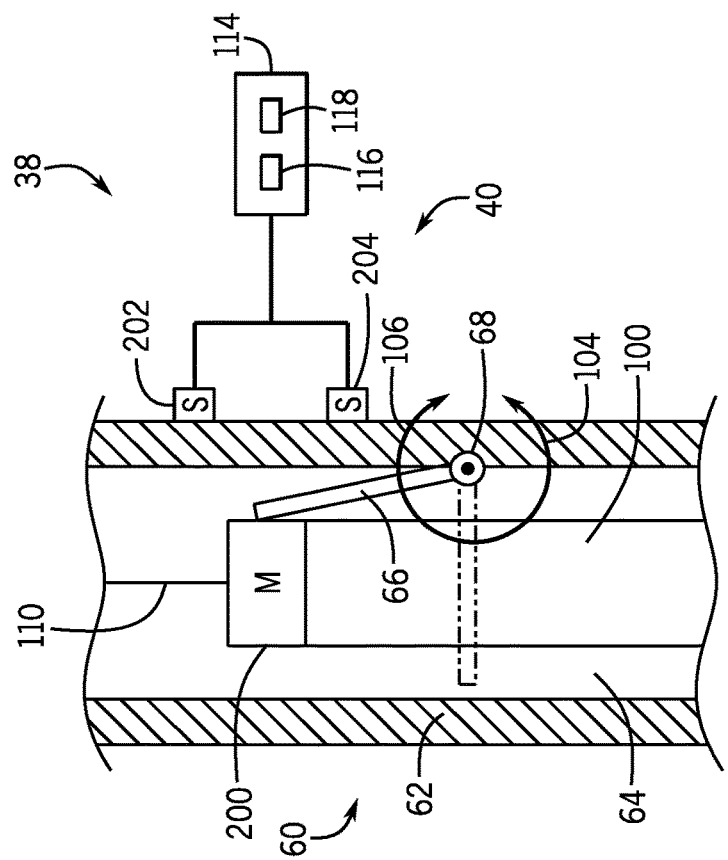
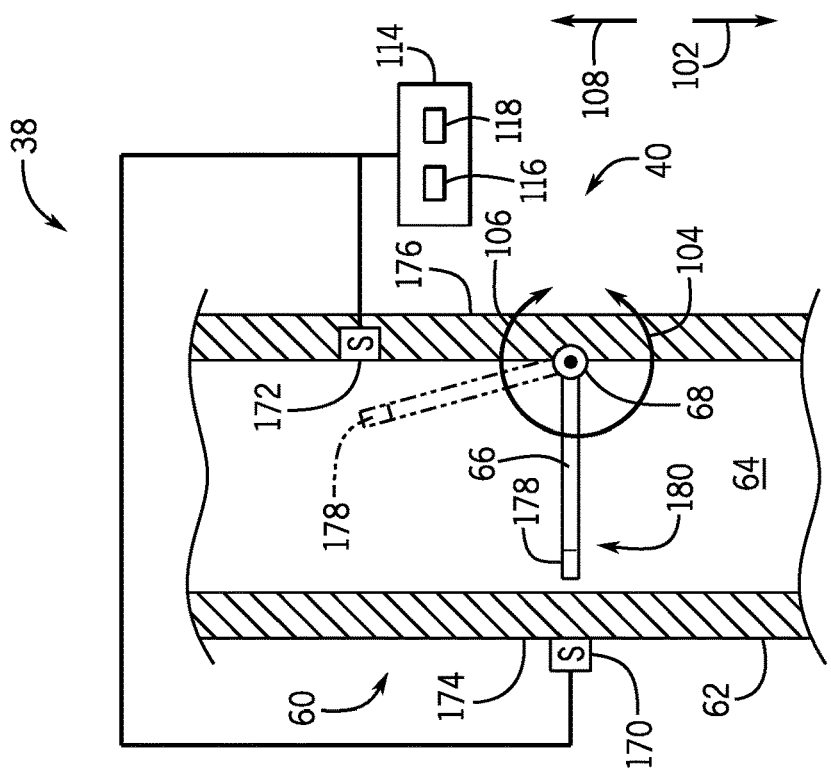

TOOL POSITION DETECTION SYSTEM

CROSS-REFERENCE TO RELATED APPLICATION

The present document is based on and claims priority to U.S. Provisional Application Ser. No.: 62/694,887, filed Jul. 6, 2018, which is incorporated herein by reference in its entirety.

BACKGROUND

To meet consumer and industrial demand for natural resources, companies often invest substantial amounts of time and money in searching for and extracting oil, natural gas, and other subterranean resources from the earth. Once a desired subterranean resource is discovered, drilling and production systems are employed to access and extract the resource. These systems may be located onshore or offshore depending on the location of a desired resource. Such systems generally include a wellhead assembly through which the resource is extracted. These wellhead assemblies may include a wide variety of components, e.g. casings, valves, fluid conduits, that control drilling or extraction operations. Additionally, such wellhead assemblies may use a fracturing tree and other components to facilitate a fracturing process and to enhance production from a well. As will be appreciated, resources such as oil and natural gas are generally extracted from fissures or other cavities formed in various subterranean rock formations or strata.

To facilitate extraction of such resources, a well may be subjected to a fracturing process that creates one or more fractures in a rock formation. These fractures may connect to pre-existing fissures and cavities enabling oil and gas to flow into the wellbore. The fracturing process may include perforating the rock formation with charges and then injecting a pressurized fracturing fluid into the well. The high pressure of the fluid increases crack size and crack propagation through the rock formation to release oil and gas, while the proppant prevents the cracks from closing once the fluid is depressurized. To create the perforations, a tool lowers the charges to a desired well depth. After perforating the rock formation with the charges, the tool is removed from the well and the well is pressurized to increase crack propagation. However, closing one or more valves before removing the tool from the well may sever the wireline suspending the tool.

Attempts have been made to track tool position so as to prevent premature closing of the valve(s). For example, wireline tools strings may be deployed and retrieved as the wireline passes through reels. Such reels have been equipped with optical encoders which can be used to track movement of the wireline. Additionally, sensors have been used to scan for objects along the tool string to determine position. However, such approaches can be highly dependent on the hardware/software implementation or sensing accuracy which can substantially increase operational cost.

SUMMARY

In general, a system and methodology are provided for operation at a wellhead to facilitate use of tools downhole. According to an embodiment, a frac stack may be coupled to the wellhead and may include a flow control device which opens and closes a bore extending through the wellhead. A lubricator may be coupled to the frac stack. The lubricator includes a tool trap which opens and closes to facilitate controlled movement of a tool along the bore. A tool position detection system is used to detect a position of the tool in the tool trap to ensure, for example, removal of the tool from the frac stack before closure of the flow control device.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 10 is a schematic cross-sectional illustration of an example of a lubricator with a tool position detection system, according to an embodiment of the disclosure;

FIG. 11 is a schematic cross-sectional illustration of another example of a lubricator with a tool position detection system, according to an embodiment of the disclosure;

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology to facilitate well operations involving tools which are employed downhole in a borehole, e.g. a wellbore. According to an embodiment, a frac stack may be coupled to a wellhead and may include a flow control device, e.g. a valve, which opens and closes a bore extending through the wellhead. A lubricator may be coupled to the frac stack. The lubricator includes a tool trap which opens and closes to facilitate movement of a tool along the bore, e.g. deployment of the tool downhole or retrieval of the tool.

By way of example, a tool may be deployed or retrieved via wireline. During deployment, the tool is placed inside the tool trap of the lubricator, which may have a grease-injection section and sealing elements. After the lubricator is pressurized to wellbore pressure, top valves (or other type of flow control device) of a frac tree may be opened to enable the tool to fall into or be pumped into the wellbore. After the wireline operation is completed, the reverse process is used and the tool is pulled up into the tool trap of the lubricator under wellbore pressure. The frac tree valves are than closed and pressure in the lubricator is bled off. The lubricator may then be opened for removal of the tool. In various applications, the frac tree uses gate valves or other suitable valves which, if closed prematurely, can cut the wireline cable. This can lead to undesirable events such as the tool falling back into the well. However, a tool position detection system described herein prevents premature closing of the valves, e.g. gate valves, and thus prevents undesirable cutting of the wireline cable.

The tool may comprise a variety of tools and tool strings. In some embodiments, the tool may comprise an individual tool or a string of tools, e.g. a perforating gun, a logging tool, or another type of tool, conveyed downhole for performance of a desired well operation. The tool, e.g. tool string, is then retrieved to the surface before subsequent well operations are performed. The tool position detection system is used to detect a position of the tool in the tool trap to ensure, for example, removal of the tool from the frac stack before closure of the flow control device, e.g. closure of a valve or valves.

Figure 1:
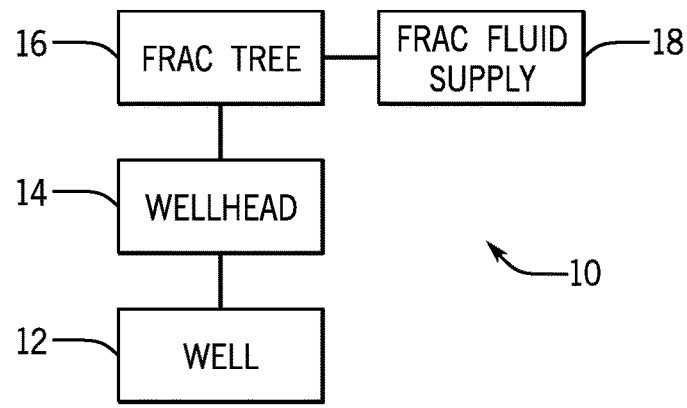
FIG. 1 is a schematic illustration of a well system which may be used for performance of a hydraulic fracturing operation, according to an embodiment of the disclosure.
Figure 2:
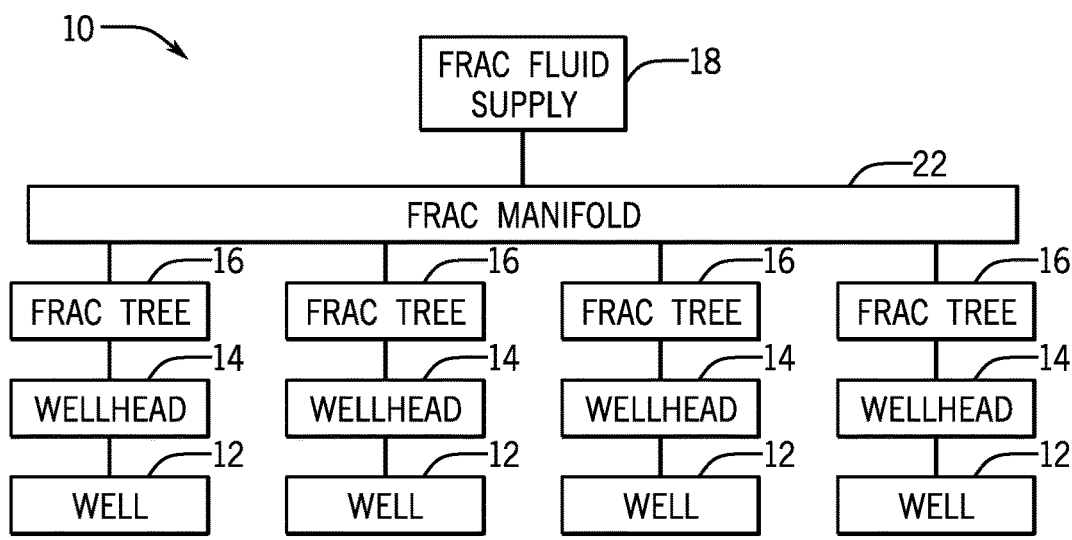
FIG. 2 is a schematic illustration of another example of a well system which may be used for performance of a hydraulic fracturing operation, according to an embodiment of the disclosure.

Referring generally to FIGS. 1 and 2, examples of a fracturing system, e.g. a hydraulic fracturing system, 10 are provided in accordance with certain embodiments. The fracturing system 10 facilitates extraction of natural resources, such as oil or natural gas, from a subterranean formation via one or more wells 12 and wellheads 14. By injecting a pressurized fracturing fluid into a well 12, the fracturing system 10 increases the number and/or size of fractures in a rock formation or strata to enhance recovery of natural resources. The illustrated wells 12 are surface wells, but it will be appreciated that resources may be extracted from other types of wells 12, such as platform or subsea wells.

The fracturing system 10 may include various components to control flow of a fracturing fluid into the well 12. For example, the fracturing system 10 depicted in FIG. 1 includes a fracturing tree 16 which receives fracturing fluid from a fluid supply 18. In some embodiments, the fracturing fluid supply 18 is provided by trucks that pump the fluid to fracturing tree 16, however other suitable sources of fracturing fluid and techniques for transmitting such fluid to the fracturing trees 16 may be used. The fluid supply 18 may be connected to fracturing tree 16 directly or via a fracturing manifold 22, as generally illustrated in FIG. 2. The fracturing manifold 22 may include conduits, e.g. pipes, as well as valves or sealing rams to control the flow of fracturing fluid to the fracturing trees 16 (or from the fracturing trees 16 during, for example, a flow back operation). As illustrated in FIG. 2, the fracturing manifold 22 provides fracturing fluid to multiple fracturing trees 16 and this fracturing fluid may then be routed into respective wells 12 via corresponding wellheads 14. In some embodiments, the fracturing manifold 22 may be coupled to a single fracturing tree 16.

Figure 3:
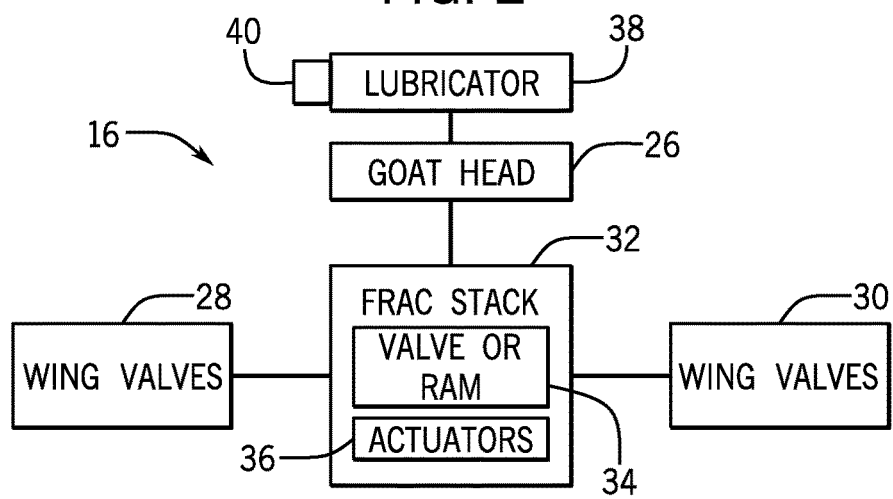
FIG. 3 is a schematic illustration of an example of a fracturing tree, according to an embodiment of the disclosure.

An example of a fracturing tree 16 is illustrated in FIG. 3. The fracturing tree 16 includes a goat head 26, wing valves 28 and 30, and a frac stack 32. The goat head 26 includes one or more connections for coupling the fracturing tree 16 to the fluid supply 18, e.g. via fracturing manifold 22. This allows fracturing fluid from the fluid supply 18 to enter the fracturing tree 16 through the goat head 26 and to then flow into the frac stack 32. When included, the wing valves 28, 30 may have various forms. In some embodiments, the wing valves 28 include pump down valves for controlling the flow of a pump down fluid into the frac stack 32, while the wing valves 30 may include valves for controlling flow back fluid exiting the well 12 through the wellhead 14 and the frac stack 32.

The frac stack 32 may include a flow control device 34, e.g. valve(s) or ram(s). The flow control device 34 may comprise at least one valve and/or at least one ram which may be used to control flow of the fracturing fluid with respect to the fracturing tree 16, e.g. into or out of well 12. The valve system of frac stack 32 also may include actuators 36 which correspond with the valves/rams 34. By way of example, each actuator 36 may be an electric actuator, pneumatic actuator, hydraulic actuator, other suitable type of actuator, or a combination thereof.

To facilitate insertion of tools into the well 12, the fracturing tree 16 includes a lubricator 38 coupled to the frac stack 32 via, for example, goat head 26. The lubricator 38 is an assembly with a conduit that enables a tool, e.g. a tool string, to be inserted into the well 12 under pressure. The tool string may include logging tools, perforating guns, and/or other types of tools. For example, a perforating gun may be placed in the lubricator 38 for insertion into the well 12. The pressure in the lubricator may then be increased until it reaches the pressure of the well 12. The frac stack 32 is then opened enabling the perforating gun to be lowered into the well 12 with a wireline. After performing downhole operations, e.g. perforating the casing, the tool/perforating gun is withdrawn back into the lubricator with the wireline. The lubricator 38 may then be depressurized and the perforating gun removed (or the perforating gun may be left in the lubricator 38 until it is used again). After retrieving the tool to the lubricator 38, the flow control device 34, e.g. one or more valves, in the frac stack 32 may again be closed. However, closing the flow control device 34 in the frac stack 32 before completely withdrawing the tool may sever the wireline suspending the tool. The fracturing system 10 therefore includes a tool position detection system 40 to detect withdrawal of the tool out of the frac stack 32. The tool position detection system 40 may be used to increase an operator's situational awareness on a jobsite when controlling valves in the fracturing system 10.

Figure 4:
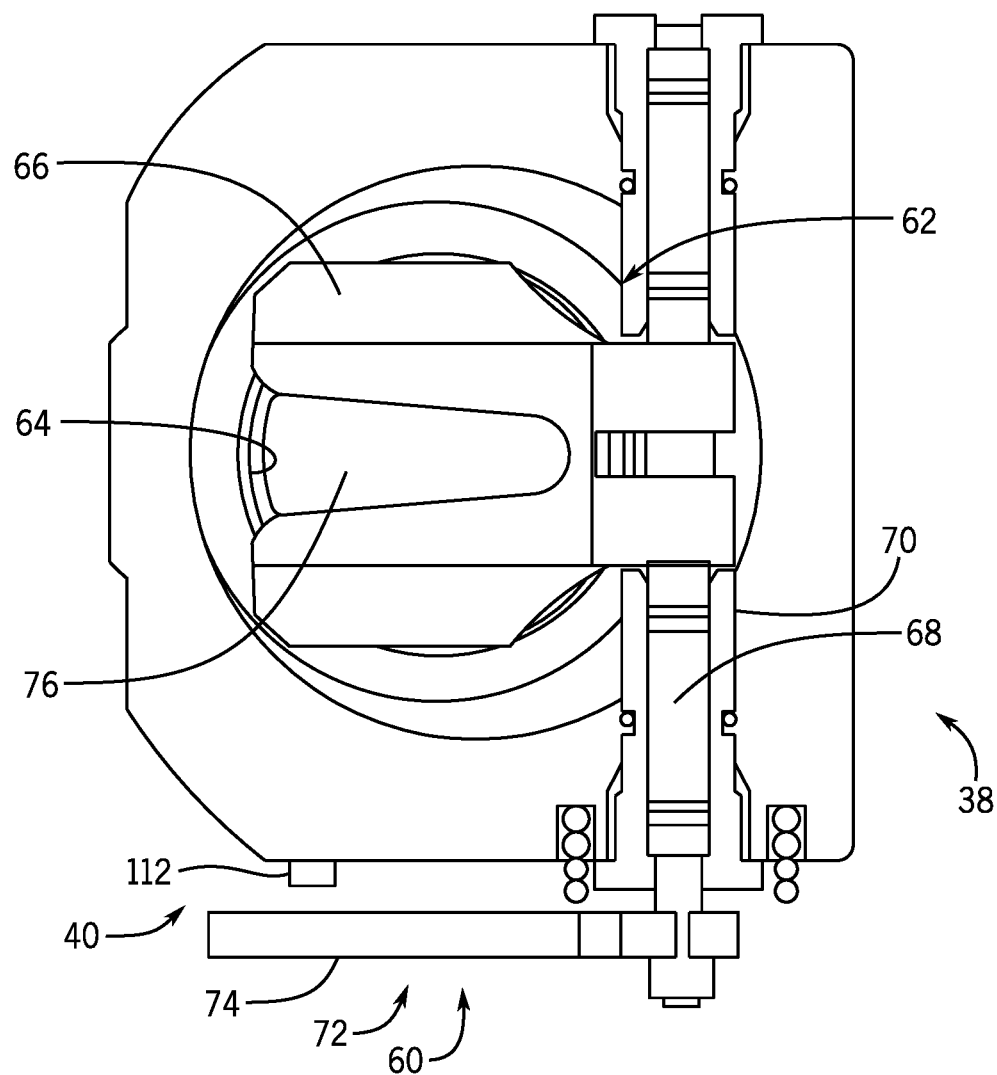
FIG. 4 is a schematic cross-sectional illustration of an example of a lubricator with a tool trap, according to an embodiment of the disclosure.

Referring generally to FIG. 4, a cross-sectional view is provided of an embodiment of the lubricator 38 with a tool trap 60. As explained above, the lubricator 38 is an assembly that facilitates the insertion of tools into a well 12. The lubricator 38 includes a conduit 62 capable of containing high pressures in situations where the lubricator 38 is pressurized. For example, the conduit 62 may be pressurized to facilitate tool transmission into well 12 by equalizing the pressure in the lubricator 38 with the pressure of the well 12. The conduit 62 defines a bore 64 through which tools pass into and out of the well 12. To block unintended insertion of tools into the well 12, the lubricator 38 may include the tool trap 60. In the example illustrated, the tool trap 60 includes a flapper 66, e.g. a projection or plate, placed within the bore 64. The flapper 66 is coupled with a shaft 68 that passes through an aperture 70 which may be oriented generally transversely with respect to the conduit 62 as illustrated. Rotation of the shaft 68 opens the flapper 66 to enable tools to pass through the lubricator 38 and into the well 12. The shaft 68 may be coupled to an actuator 72 which enables rotation of the flapper 66 from a closed position, i.e. when the flapper extends across the bore 64, to an open position. In some embodiments, the actuator 72 may include or may be in the form of a manual actuator having an external handle 74. However, the actuator 72 may be an electric actuator, pneumatic actuator, hydraulic actuator, or an actuator having a combination of actuating mechanisms.

Wirelines may be coupled with tools to lower them into well 12 and to enable retrieval of the tools. To facilitate movement of the tool into and out of the well 12 and through the tool trap 60, the flapper 66 may define a slot or aperture 76. The slot or aperture 76 enables a wireline, while coupled to the tool, to pass through the flapper 66 when the flapper 66 is in a closed position, i.e. when the flapper extends across the bore 64.

Figure 5:
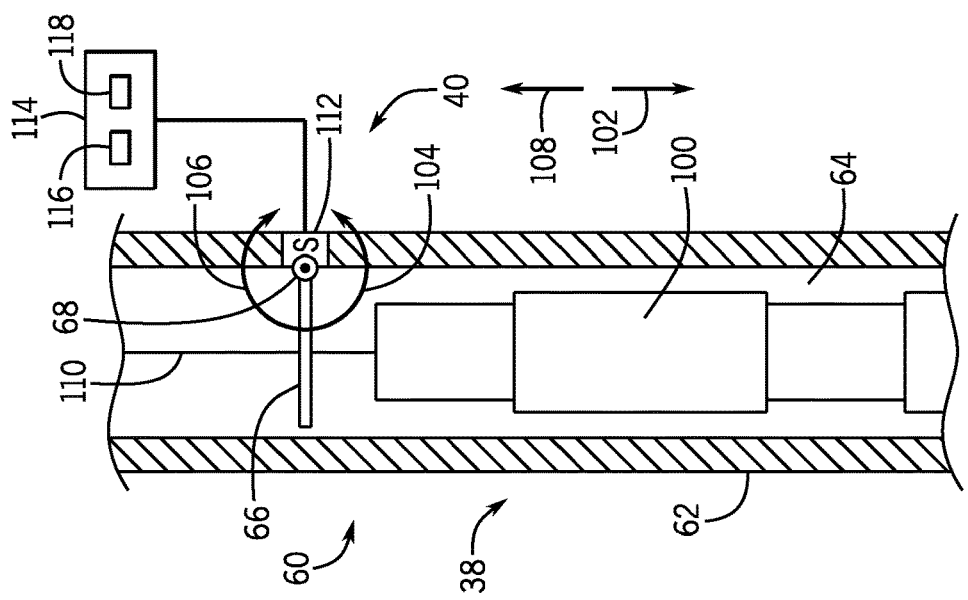
FIG. 5 is a schematic cross-sectional illustration of an example of a lubricator with a tool being moved up into the tool trap, according to an embodiment of the disclosure.

Referring generally to FIG. 5, a cross-sectional illustration is provided of lubricator 38 with a tool 100 positioned below tool position detection system 40. As explained above, tool 100 may comprise various tools such as logging tools and/or perforating guns and may be inserted into well 12 to perform various downhole operations. Such tools 100 may be inserted through the lubricator 38 which may be used to equalize pressure of fluid surrounding the tool 100 with the pressure of fluid in the well 12 to facilitate insertion of the tool 100 into the well 12. To prevent premature or unintended insertion of tool 100 into well 12, the lubricator 38 includes tool trap 60. The tool trap 60 comprises flapper 66 which rests within the bore 64 and blocks movement of tool 100 in direction 102 without input from actuator 72. That is, the flapper 66 is unable to rotate in direction 104, e.g. counterclockwise in the embodiment illustrated in the Figure, from a set position or closed position. Accordingly, objects moving in direction 102 are unable to freely pass through the tool trap 60 without an actuator rotating the flapper 66 in direction 106 and out of the way of tool 100. However, because the flapper 66 freely rotates in direction 106, tools 100 that are axially below the flapper 66 are able to move in direction 108. As the tool 100 moves in direction 108, the tool 100 contacts the flapper 66 and the flapper is rotated in direction 106. The tool 100 is then able to slide past the flapper 66 and through the tool trap 60. After the tool 100 passes through the tool trap 60, the flapper 66 rotates in direction 104 to the closed position illustrated in FIG. 5, thus blocking the tool from entering the well 12.

As explained above, the frac stack 32 may include flow control device 34, e.g. one or more valves. Closing the flow control device 34 before completely withdrawing the tool 100 may sever a wireline 110 used to suspend the tool 100 within the well 12. To detect whether the tool 100 has been sufficiently retracted, e.g. completely pulled into the lubricator 38, the fracturing system 10 includes the tool position detection system 40. The tool position detection system 40 provides feedback to increase situational awareness of the location of the tool 100. In some embodiments, the tool position detection system 40 is coupled with the tool trap 60 to determine the location of tool 100. For example, the tool position detection system 40 may be used to determine whether the tool 100 is above or below the flapper 66 and therefore whether the tool 100 is completely within the lubricator 38 and/or whether the wireline 110 or tool 100 is within the frac stack 32.

According to an embodiment, the tool position detection system 40 comprises one or more sensors 112, e.g. positional sensors or angular sensors. The sensors 112 may be coupled to the shaft 68 to detect rotation of the shaft 68. It should be noted the sensor 112 (or sensors 112) also may be mounted so as to detect movement of external handle 74 (see FIG. 4). The sensors 112 send signals to a controller 114 so as to indicate, for example, rotation of the shaft 68. In response, the controller 114 uses one or more processors 116 to execute instructions stored on one or more memories 118 to track the changes in position of the shaft 68 (and/or handle 74) with respect to time. As explained in greater detail below, by tracking the change in position with respect to time, the controller 114 is able to determine if the tool 100 has passed through the tool trap 60 and whether it is fully within the lubricator 38, i.e. axially above the flapper 66 in the lubricator 38.

By way of example, the processor 116 may be a microprocessor which executes software. The processor 116 may include multiple microprocessors, one or more general-purpose microprocessors, one or more special-purpose microprocessors, and/or one or more application-specific integrated circuits (ASICS), or some combination thereof. For example, the processor 116 may include one or more reduced instruction set (RISC) processors.

The memory 118 may include a volatile memory, such as random-access memory (RAM), and/or a nonvolatile memory, such as read-only memory (ROM). The memory 118 may store a variety of information and may be used for various purposes. For example, the memory 118 may store processor executable instructions, such as firmware or software, for the processor 116 to execute. The memory may include ROM, flash memory, a hard drive, or other suitable optical, magnetic, or solid-state storage medium, or a combination thereof. The memory may store data, instructions, and other suitable data.

Figure 6:
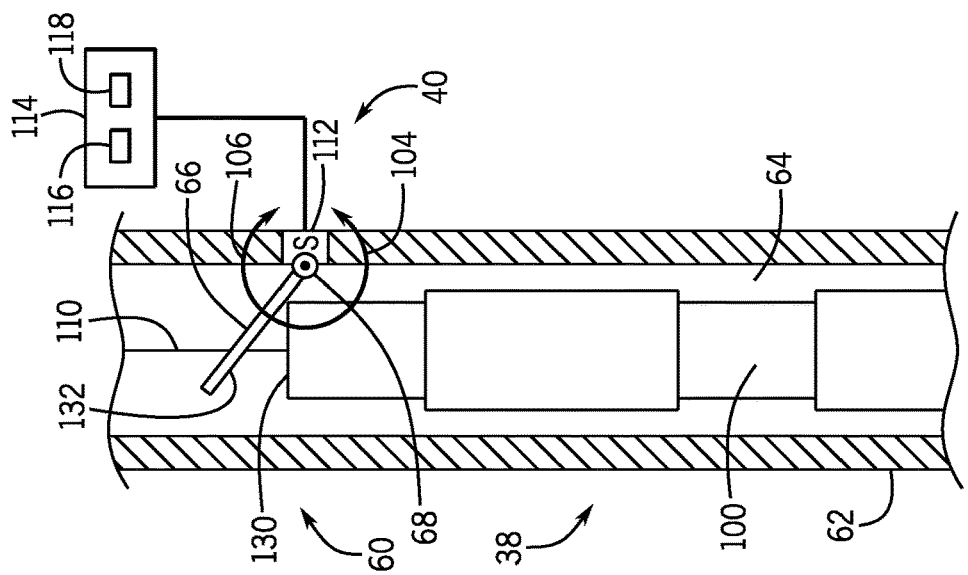
FIG. 6 is a schematic cross-sectional illustration of an example of a lubricator with a tool being moved through a flapper positioned within the tool trap, according to an embodiment of the disclosure.

FIG. 6 provides a cross-sectional view of the lubricator 38 with the tool 100 passing through tool position detection system 40. As the wireline 110 retracts and withdraws the tool 100 from the well 12, the wireline 110 passes freely through the aperture or opening 76 in the flapper 66. However, the tool 100 is too large to pass through the aperture/opening 76 in flapper 66. A top surface of the tool 100 therefore contacts a bottom surface 132 of the flapper 66. The force of the tool 100 on the flapper 66 rotates the flapper in direction 106 while also rotating shaft 68 (and external handle 74 if such handle is included. The sensor 112 detects rotation of the shaft 68/movement of handle 74 and communicates this movement to the controller 114.

Figure 7:
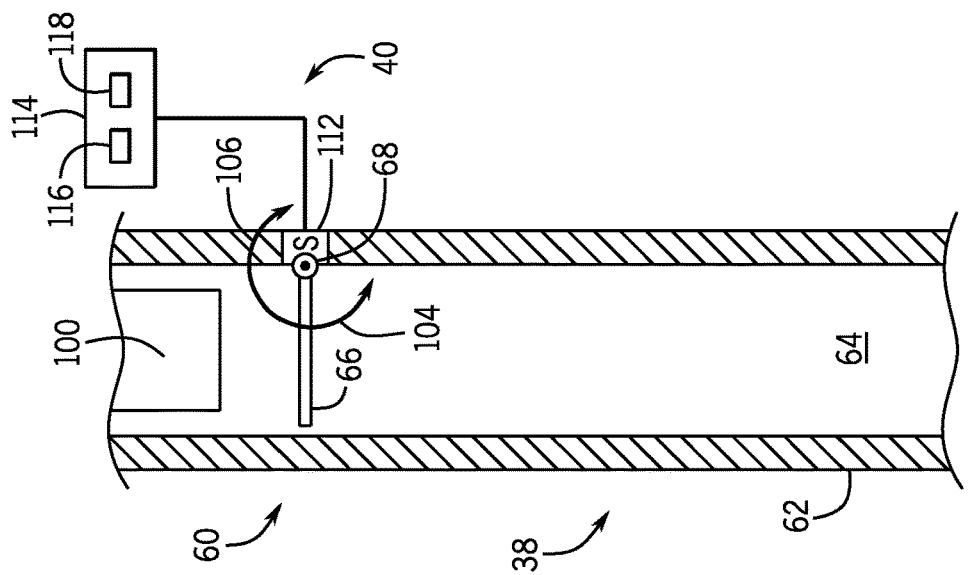
FIG. 7 is a schematic cross-sectional illustration of an example of a lubricator with a tool being moved up out of the tool trap, according to an embodiment of the disclosure.

FIG. 7 provides a cross-sectional view of the lubricator 38 with the tool 100 after the tool 100 has passed through the tool trap 60. After the tool 100 passes through the tool trap 60, the flapper 66 no longer contacts the tool 100 which allows gravity to return the flapper 66 to the closed position by rotating the flapper 66 in direction 104. In this position, the flapper 66 is able to block tools 100 from passing through the lubricator 38 in direction 102. Rotation of the flapper 66 and the shaft 68/handle 74 in direction 104 is detected by the sensor 112 and communicated to the controller 114.

As indicated above and as illustrated in FIG. 4, one or more sensors 112 may be mounted on or adjacent the external handle 74 of the tool trap 60. For example, a position sensor 112 (or other suitable sensor) may be mounted on or adjacent the external handle 74 to monitor the handle angle as the handle 74 rotates during passing of the tool 100. The movement of handle 74 may be monitored and recorded in real-time. By way of example, the angle/position of the handle 74 may be monitored and explicitly displayed on, for example, a computer display by virtue of suitable operation software such as FracTree operation software. As a result, an operator can view and monitor the physical movement of the handle 74. The monitoring data also may be recorded so that passing of the tool 100 may be captured and reported even if the actual event is not viewed.

Figure 8:
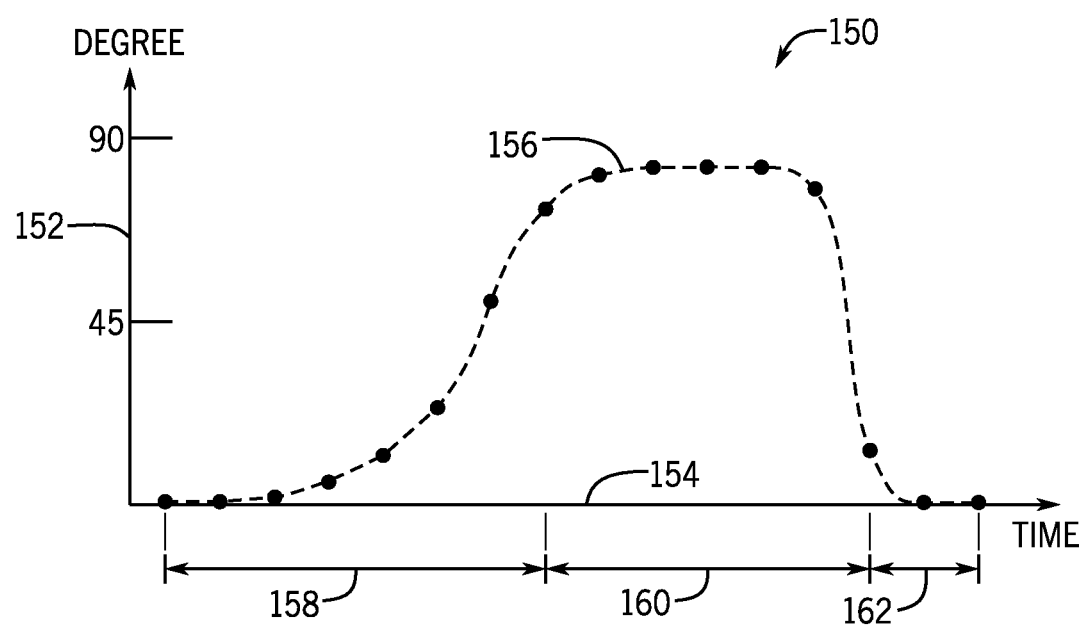
FIG. 8 is a graphical illustration showing angular displacement over time with respect to a flapper of a tool trap as a tool passes through the tool trap, according to an embodiment of the disclosure.

Referring generally to FIG. 8, a graph 150 is provided to illustrate the angular displacement of the flapper 66 with respect to time as the tool 100 passes through the tool trap 60. As illustrated, the y-axis 152 represents the change in angle of the flapper 66 and the x-axis represents time. The line 156 represents feedback from the sensor 112 as the sensor 112 detects changes in position over time as tool 100 contacts the flapper 66 and moves through the tool trap 60. By way of example, this movement may be monitored by using sensor 112 to monitor rotation of shaft 68 and/or movement of external handle 74. In the illustrated example, the graph line 156 represents three phases 158, 160 and 162 of the tool 100 passing through the tool trap 60. In the first phase 158, the graph line 156 represents the tool 100 contacting and rotating the flapper 66 out-of-the-way of tool 100. In the second phase 160, the graph line 156 represents the tool 100 sliding past the flapper 66 in an open position. In the third phase 162, the graph line 156 represents the tool 100 having passed completely through the tool trap 60 and the flapper 66 rotating back to a closed position.

Figure 9:
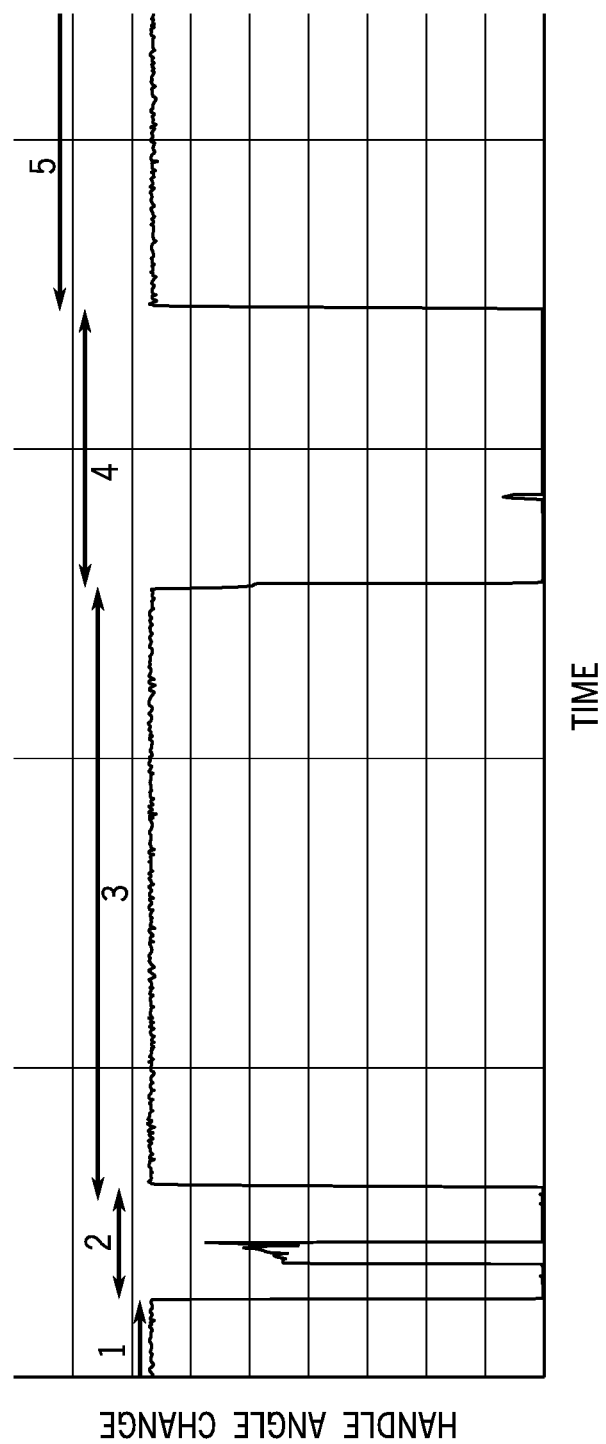
FIG. 9 is a graphical illustration showing details of movement of a tool trap external handle as a flapper is pivoted between positions, according to an embodiment of the disclosure.

The data obtained from the sensor or sensors 112 may be collected and stored over time. In FIG. 9, for example, a graph is provided which indicates the instantaneous and historical position of external handle 74 when monitored by a corresponding sensor or sensors 112. The recorded data provides a "signature" of the movement of external handle 74. This graph provides details of angle change of the external handle in the period starting from an end of a stage to the beginning of the next stage. In various applications, the flapper 66 may be held at a vertical open position most of the time during a stage to reduce wear on the wireline/cable 110 due to possible abrasion as it moves through the slot or aperture 76. When the tool 100 approaches the ground surface, e.g. a few hundred feet from the ground, actuation force (e.g. hydraulic force) applied to the external handle 74 is released. This allows the handle 74 and the flapper 66 to return to the horizontal, closed position which also allows the corresponding sensor 112 to provide data regarding the passing of tool 100. This transition is marked as time period 1 in FIG. 9.

When the tool 100 arrives and pushes the flapper 66 open, this is indicated at time period 2 as the angle of external handle 74 increases and eventually returns to 0 when the tool 100 passes. After the tool 100 fully returns to the lubricator 38, the lubricator 38 may be detached from the frac tree. The tool 100 may then be taken out of the lubricator 38 for the preparation of the next stage's perforation. In this example, the tool trap flapper 66 opens in one direction and the tool 100 cannot exit the lubricator 38 from the top. Therefore, in time period 3, actuation force is applied to the handle 74 to let the tool 100 exit at the bottom of the lubricator 38 for reloading.

After reloading, the tool 100 may be retracted to the lubricator 38 which will be attached to the top of the frac tree for the next stage operation. During time period 4, the tool trap 60 is closed to prevent the tool 100 from accidentally falling during the movement. After the next age operation starts, actuation force is applied to the flapper 66 so that it will be held in an upward position once again to reduce the potential abrasion to the wireline 110. This action is illustrated in time period 5. The graphical example provided in FIG. 9 demonstrates that there may be multiple instances of a change in angle of the flapper 66 from horizontal to vertical during an operational event involving pulling the tool 100 out of the well. The handle 74 and flapper 66 also can transition for various other reasons. However, various sensor systems may be used to accurately track the position of tool 100. For example, a backup sensor system, e.g. one or more backup sensors, may be used to ensure accurate detection and knowledge with respect to the position of both flapper 66 and tool 100 as described in greater detail below.

Referring generally to FIG. 10, a cross-sectional view is provided of lubricator 38 with tool position detection system 40. The tool position detection system 40 includes first and second sensors 170, 172 which enable the controller 114 to determine the position of flapper 66. More specifically, the first and second sensors 170, 172 enable the controller to determine if the flapper is in an open position or a closed position. The first sensor 170 rests on a side 174 of the conduit 62 opposite a side 176 which is coupled to the shaft 68. This arrangement enables the sensor 170 to detect when the flapper 66 is in a closed position. For example, the flapper 66 may include a magnet 178 in an end 180 of the flapper 66. The sensor 170 detects the presence of the magnet 178 and transmits the signal to the controller 114. The controller 114 is thus able to determine that the flapper 66 is in a closed position. The sensor 170 also transmits to the controller 114 a signal indicating the absence of the magnet 178 which may indicate that the flapper is in an open position. As explained above, when the tool 100 passes through the tool trap 60, the flapper 66 rotates in direction 106 in response to contact between the tool 100 and the flapper 66. As the flapper 66 and magnet 178 rotate away from the sensor 170, the sensor 170 detects the absence of the magnet 178.

In some embodiments, the tool position detection system 40 may include the second sensor 172 to detect whether the flapper 66 transitions from a closed position to an open position. For example, the wireline 110 may catch on the flapper 66 or vibrations in the fracturing system 10 may move the flapper 66. These movements may be detected by the sensor 170 and interpreted as an opening of the flapper 66. By including the second sensor 172, the tool position detection system 40 is able to detect whether the flapper 66 has opened sufficiently for the tool 100 to pass through the tool trap 60. The sensor 172 likewise detects the presence of the flapper 66 and/or the presence of the magnet 178 coupled to the flapper 66. In this way, the controller 114 may receive multiple signals indicating the position of flapper 66. By monitoring the signals over time, the controller 114 is able to determine when the flapper is transitioned from a closed position to an open position and then back to a closed position, thus accurately determining whether the tool 100 is within the lubricator 38. It should be noted sensors 170, 172 may be combined with sensors 112 to provide multiple indications of flapper movement.

Referring generally to FIG. 11, a cross-sectional view is provided of lubricator 38 with tool position detection system 40. In some embodiments, the tool position detection system 40 may include at least one sensor, e.g. sensors 202, 204, to directly detect the position of tool 100. The sensors 202, 204 may be used alone or as a backup sensor system to the flapper movement detection sensors, e.g. sensors 112, 170, 172. In some embodiments, the at least one sensor 202, 204 is designed to detect at least one magnet 200 which may be coupled with the tool 100. For example, the at least one magnet 200 may be constructed as a casing collar locator (CCL). A casing collar locator uses magnets to detect casing collars that couple casing joints together as it descends or ascends so as to calculate a distance the tool 100 has traveled within the well 12.

By way of example, a pair of magnetic sensors, e.g. sensors 202, 204, may be used to detect a signal difference over time based on the presence of magnet 200. By detecting the magnet 200 coupled to the tool 100, the tool position detection system 40 is able to determine whether the tool 100 is within the lubricator 38. The indications from sensors 202, 204 may be used in combination with the data provided by the flapper rotation sensors, e.g. sensors 112, 170, 172. In this manner, sensors 202, 204 may be used as a backup system to ensure an accurate determination of the position of tool 100 with respect to tool trap 60.

It should be understood that sensors 202, 204 may be placed farther away from the tool trap 60 to ensure the entire tool 100 is above the flapper 66 when moving in direction 108. The tool position detection system 40 may include first and second sensors 202 and 204 to provide redundancy as well as to enable the controller 114 to determine the direction of travel of the tool 100. Determining the direction of travel enables the controller 114 to determine if the tool 100 is moving into lubricator 38 from below or heading into the well 12. For example, if the tool 100 is moving in direction 108, the sensor 204 detects the magnet 200 first followed by the sensor 202. Detection of the magnet 200 in this time order indicates the tool 100 is moving into or is within the lubricator 38. Likewise, if the tool 100 is moving in direction 102, the sensor 202 will first detect the magnet 200 followed by the sensor 204. A detection of the magnet 200 in this time order indicates that the tool is still in the well 12 or moving into the well 12. In this manner, the order of detection in combination with the time-lapse enables a controller 114 to determine the direction of travel of the tool and therefore whether the tool 100 is within the lubricator 38 or in the well 12. As described above, this data may be combined with data from the flapper position sensors, e.g. sensors 112, 170, 172, to further verify the position of tool 100, e.g. to verify whether the tool 100 is within lubricator 38.

Figure 12:
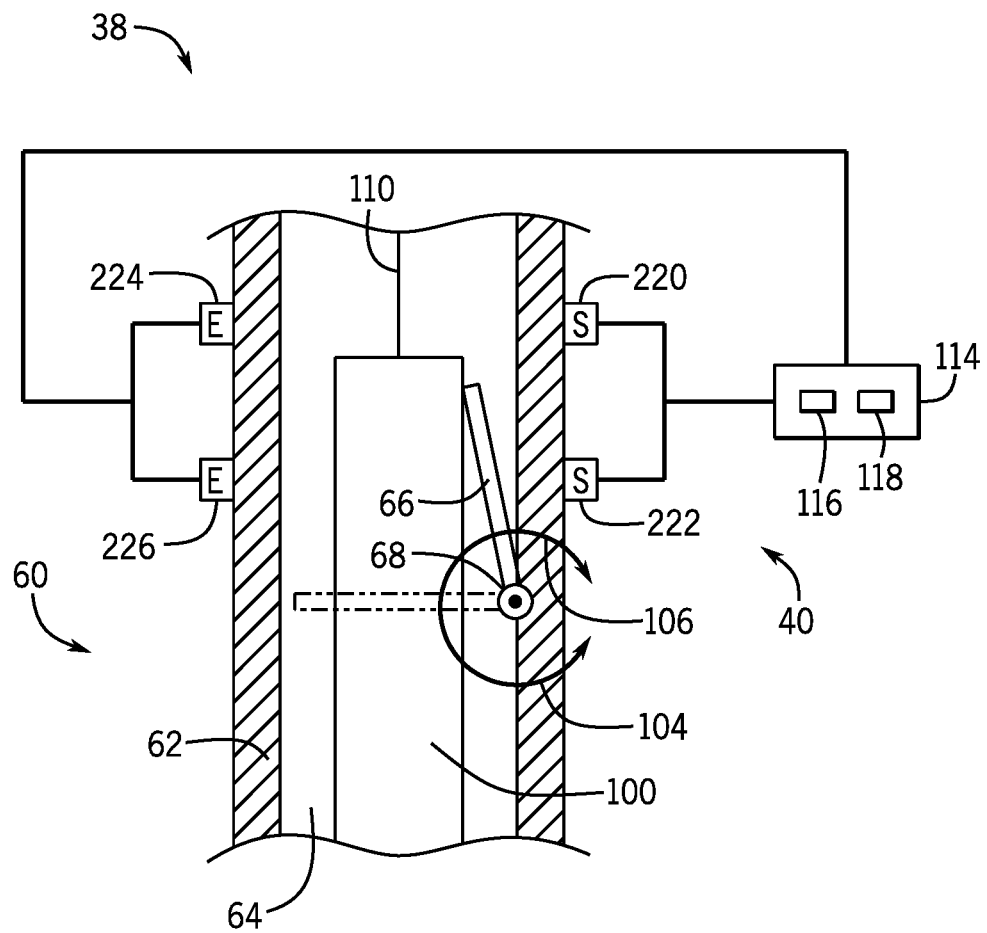
FIG. 12 is a schematic cross-sectional illustration of another example of a lubricator with a tool position detection system, according to an embodiment of the disclosure.

Referring generally to FIG. 12, a cross-sectional illustration is provided of lubricator 38 with tool position detection system 40. In this type of embodiment, the tool position detection system 40 may comprise sensors, such as sensors 220, 222 which directly detect the presence of tool 100 rather than rotation of flapper 66. These types of sensors 220, 222 may be used alone to detect the position of tool 100 or as a backup system to the flapper position sensors, e.g. sensors 112, 170, 172. In this example, sensors 220 and 222 may be selected to detect ultrasonic signals emitted from respective emitters 224 and 226 (e.g. ultrasonic emitters). As the tool 100 passes between emitters 224, 226 and sensors 220, 222, the tool 100 changes the signals, e.g. distorts the signals, from emitters 224, 226. The sensors 220, 222 detect the changes, e.g. distortions, of the ultrasonic signals and transmit this to the controller 114. The controller 114 interprets this change/distortion as indicative of the presence of tool 100 and thus whether the tool 100 is within lubricator 38. It should be understood that sensors 220, 222 and emitters 224, 226 may be placed farther away from the tool trap 62 ensure the entire tool 100 is above the flapper 66 when moving in direction 108.

The tool position detection system 40 may include first and second sensors 220 and 222 to provide redundant detection as well as to enable the controller 114 to determine the direction of travel of tool 100. Determining the direction of travel enables the controller 114 to determine if the tool 100 has been retracted into lubricator 38 or is heading into well 12. For example, if the tool is moving in direction 108, the sensor 222 first detects the tool 100 followed by the sensor 220. A detection of the tool 100 in this time order indicates the tool 100 is moving into or is within the lubricator 38. Likewise, if the tool 100 is moving in direction 102, the sensor 220 detects the tool 100 first followed by the sensor 222. A detection of the tool 100 in this time order indicates that tool 100 is still in the well 12 or descending into the well 12. In this manner, the order of detection in combination with the time-lapse enables a controller 114 to determine the direction of travel of the tool and therefore whether the tool 100 is within the lubricator 38 or in the well 12. As described above, this data may be combined with data from the flapper position sensors, e.g. sensors 112, 170, 172, to further verify the position of tool 100, e.g. to verify whether the tool 100 is within lubricator 38.

It should be noted that an additional sensor or sensors may be used to determine the state of the valve/ram 34. This knowledge could help reduce false reporting. The data from the flapper position provided by flapper position sensors, e.g. sensors 112, 170, 172, may be used in combination with tool position sensor data from, for example, sensors 202, 204, 220, 222, 228, 230 to enable improved decision-making with respect to closing the valve/ram 34 on the path of the wireline tool 100. However, this decision-making is needed only when the valve/ram 34 is open. If the valve/ram 34 is already closed, the decision is not needed.

Figure 13:
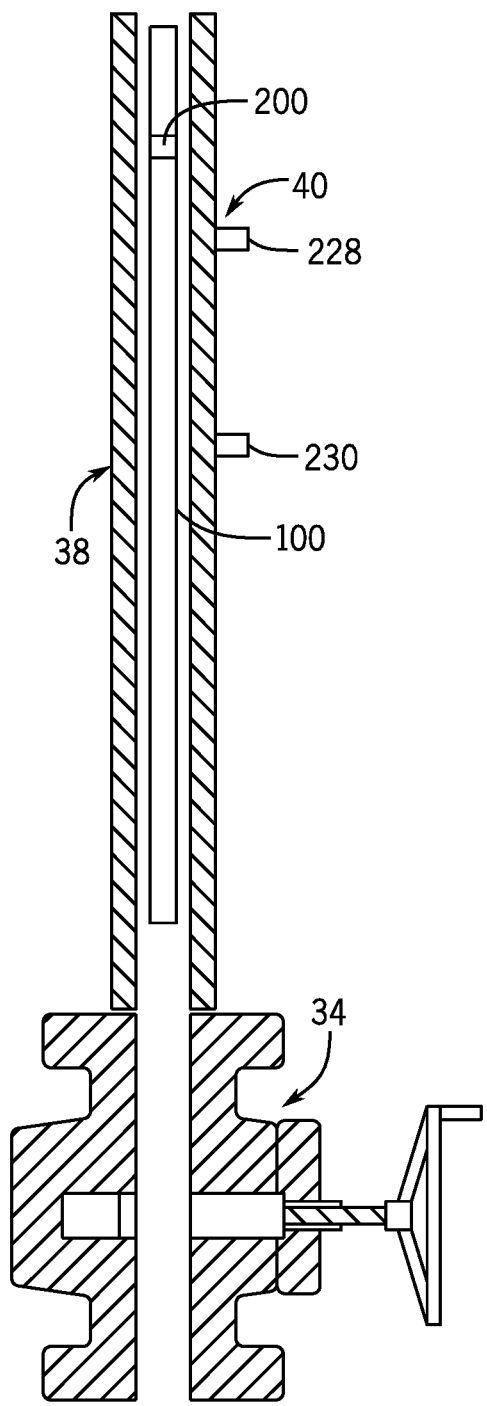
FIG. 13 is a schematic cross-sectional illustration of another example of a lubricator with a tool position detection system, according to an embodiment of the disclosure.
Figure 14:
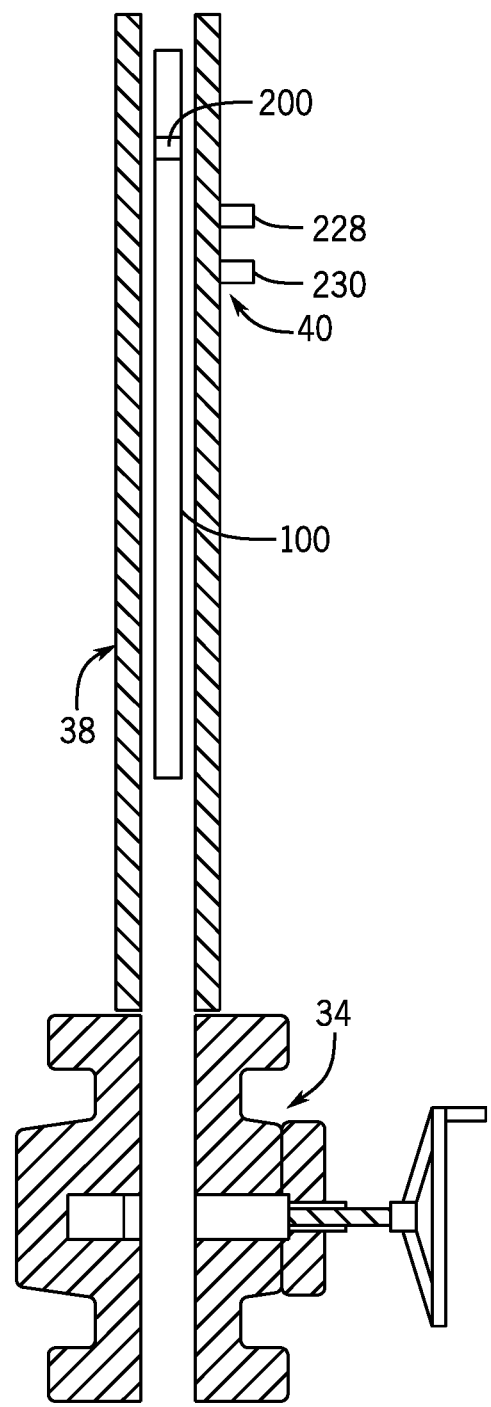
FIG. 14 is a schematic cross-sectional illustration of another example of a lubricator with a tool position detection system, according to an embodiment of the disclosure.

Referring generally to FIGS. 13 and 14, another embodiment is illustrated in which sensors 228, 230 are placed sufficiently high on the lubricator 38 such that one or both sensors are able to detect when a collar locator (CCL), e.g. magnet 200, is sufficiently above the flow control device 34 to enable flow control device closure, e.g. valve closure. This type of arrangement eliminates the need for tool trap 60 although certain embodiments also may employ tool trap 60 in combination with sensors 228, 230. In the arrangement illustrated in FIG. 13, the top sensor 228 is positioned to detect when tool 100, e.g. a tool string, is a safe distance from flow control device 34 to enable closure. In the arrangement illustrated in FIG. 14, the top sensor 228 and the bottom sensor 230 are both positioned to detect when the tool 100, e.g. a tool string, is a safe distance from flow control device 34 to enable closure.

According to a first scenario, the sensors 228, 230 (illustrated in FIG. 13) may work in cooperation with controller 114 to place the system into an "allow this valve to be closed" state when the valve 34 initially changes from closed to open. Upon detecting movement of the CCL/magnets 200 past either sensor 228, 230, the system would move to one of two "disallow closing" states. The first state ("disallow closing, CCL below top sensor 228") enables the system to return to "allow this valve to be closed" or to proceed to "disallow closing, CCL below bottom sensor" depending on the next detection. When the next detection is from the lower sensor 230, the system state advances to "disallow closing, CCL below bottom sensor 230" which would be the expected state path. However, in the case of a problem not related to the system, the CCL may drop below the top sensor 228 and then return to a position above the top sensor 228 in which case the system state should return to "allow this valve to be closed". In either case, the system is not allowed to return to the "allow this valve to be closed" state after detection from the lower sensor 230 until it detects a movement in the up direction.

In a second scenario where both sensors 228, 230 are positioned to detect whether the tool 100, e.g. tool string, is at a safe distance from the flow control device 34 (see FIG. 14), the approach may be similar to that described above with respect to the first scenario. However, arming into the "disallow closing" state only happens when movement is detected past the bottom sensor 230. The two sensors 228, 230 are still used as a state change back to "allow this valve to be closed" and this involves detection of CCL 200 past both sensors 228, 230 in the up direction. The software/logic for both the first scenario and the second scenario can be implemented on, for example, controller 114 via software. The logic (state diagram) from the first scenario would work in the second scenario. By using the same logic for both scenarios, an operator would not have to select one option or the other with respect to the software utilized.

Such a logic system for utilizing data from sensors 228, 230 could be embodied in software on controller 114 and would be useful for helping wireline companies avoid two common failures associated with wireline pressure operations and specifically with pull-offs associated with bumping up the tool 100 upon return to surface and failure to bleed off the pressure on the tool trap 60. When retrieving wireline tools in wells with pressure, a "bump-up" in the lubricator is desired before closing the well. When "bumping up", a wireline operator pushes down on the wireline or lower sheave. This creates a longer path in the wireline such that when the tool 100 touches the top of the lubricator 38, the operator can feel the bump while the longer path allows time for the winch operator to shut down the winch. The sensing and state techniques described with respect to FIGS. 13 and 14 can be used by the wireline crew to shut down the winch automatically when the proper state is recognized. This would be especially beneficial when the tool 100, e.g. tool string, is heavy and the pushing down on the wireline cannot generate much deflection. This approach also can be used in conjunction with a depth detection system to remind the operator to bleed off pressure on the tool trap 60. Accordingly, the various embodiments described herein can be used with a variety of tools, techniques, and operational applications.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system, comprising:
a flow control device configured to open and close a bore through a wellhead;
a lubricator coupled in fluid communication with the flow control device, the lubricator comprising:
a tool trap comprising a flapper configured to move between an open position and a closed position to control movement of a tool in a first direction into a well, wherein the flapper comprises an aperture to pass a line coupled to the tool after the tool passes through the tool trap in the first direction and the flapper moves from the open position to the closed position, wherein the flapper is configured to move from the closed position to the open position in a second direction opposite the first direction in response to a force provided by the tool moving in the second direction away from the well into the tool trap; and
a tool position detection system configured to detect a position of the tool, the tool position detection system comprising:
a first sensor system configured to detect a flapper position of the flapper, wherein the flapper position is configured to indicate movement of the flapper from the closed position to the open position when the tool moves in the second direction into the tool trap;
a second sensor system to monitor movement of the tool as it moves into or out of the tool trap; and
a controller coupled to the first sensor system and the second sensor system, wherein the controller is configured to determine the position of the tool in response to feedback from at least one of the first sensor system and the second sensor system.

2. The system as recited in claim 1, wherein the flapper is configured to move from the closed position to the open position only in the second direction.

3. The system as recited in claim 1, wherein the first sensor system is configured to monitor the flapper position relative to time as the flapper moves from the closed position to the open position when the tool moves in the second direction into the tool trap.

4. The system as recited in claim 1, wherein the flapper is coupled to an arm that rotates and to an external handle, the first sensor system having at least one sensor to monitor a handle position of the external handle.

5. The system as recited in claim 1, wherein the first sensor system comprises a rotation sensor configured to detect rotation of an arm, to which the flapper is mounted, in response to movement of the flapper.

6. The system as recited in claim 1, wherein the second sensor system comprises a magnet sensor, and wherein the magnet sensor is configured to detect one or more magnets coupled to the tool.

7. The system as recited in claim 1, wherein the second sensor system comprises first and second magnet sensors, and wherein the first magnet sensor is configured to detect the tool trap in a first position and the second magnet sensor is configured to detect the tool trap in a second position.

8. The system as recited in claim 7, wherein the first and second magnet sensors are on opposing sides of the lubricator.

9. The system as recited in claim 1, wherein at least one of the first sensor system and the second sensor system is configured to detect changes in an ultrasonic signal emitted from an emitter as the tool enters and exits the lubricator.

10. The system as recited in claim 1, wherein the flapper is configured to move from the closed position to the open position in the second direction in response to the force provided by the tool directly against the flapper when the tool is moving in the second direction away from the well into the tool trap.

11. A system, comprising:
a valve or ram configured to open and close a bore that extends through a wellhead;

a lubricator positioned above the valve or ram, the lubricator comprising a tool trap comprising a flapper configured to move between an open position and a closed position to control movement of a tool in a first direction into a well, wherein the flapper comprises an aperture to pass a line coupled to the tool after the tool passes through the tool trap in the first direction and the flapper moves from the open position to the closed position, wherein the flapper is configured to move from the closed position to the open position in a second direction opposite the first direction in response to a force provided by the tool moving in the second direction away from the well into the tool trap; and a tool position detection system configured to determine if the tool is within the lubricator, the tool position detection system comprising:

a flapper sensor configured to detect a flapper position of the flapper, wherein the flapper position is configured to indicate movement of the flapper from the closed position to the open position when the tool moves in the second direction into the tool trap; and a controller coupled to the flapper sensor, the controller being programmed to determine a location of the tool in response to feedback from the flapper sensor.

12. The system as recited in claim 11, wherein the flapper is configured to move from the closed position to the open position in the second direction in response to the force provided by the tool directly against the flapper when the tool is moving in the second direction away from the well into the tool trap.

13. The system as recited in claim 11, wherein the flapper sensor is configured to monitor the flapper position relative to time as the flapper moves from the closed position to the open position when the tool moves in the second direction into the tool trap.

14. The system as recited in claim 11, wherein the flapper sensor is configured to monitor an angular orientation of the flapper.

15. The system as recited in claim 14, wherein the tool position detection system comprises a backup sensor to directly monitor presence of the tool in the tool trap.

16. A method, comprising:

monitoring for a presence of a tool in a tool trap of a lubricator coupled to a passage leading to a well with a tool position detection system, wherein a valve or ram is disposed along the passage between the lubricator and the well, wherein the tool trap comprises a flapper configured to move between an open position and a closed position to control movement of the tool in a first direction toward the well, wherein the flapper comprises an aperture to pass a line coupled to the tool after the tool passes through the tool trap in the first direction and the flapper moves from the open position to the closed position, wherein the flapper is configured to move from the closed position to the open position in a second direction opposite the first direction in response to a force provided by the tool moving in the second direction away from the well into the tool trap, wherein the tool position detection system comprises a flapper sensor configured to detect a flapper position of the flapper, and wherein the flapper position is configured to indicate movement of the flapper from the closed position to the open position when the tool moves in the second direction into the tool trap; and processing data from the flapper sensor over time via a controller to determine whether the tool has returned to the tool trap after deployment from the tool trap toward the well.

17. The method as recited in claim 16, wherein monitoring comprises obtaining the data from the flapper sensor to obtain an angular orientation of the flapper between the closed position and the open position when the tool moves in the second direction into the tool trap.

18. The method as recited in claim 16, wherein monitoring comprises obtaining the data from the flapper sensor to track the position of an external handle coupled to the flapper.

19. The method as recited in claim 16, wherein monitoring further comprises obtaining data from a backup sensor of the tool position detection system to detect the location of the tool.

20. The method as recited in claim 19, wherein obtaining data from the backup sensor comprises obtaining data from a magnet sensor to detect the presence of a magnet coupled with the tool.

\* \* \* \* \*